United States Patent Office 3,225,025  
Patented Dec. 21, 1965

3,225,025  
DISAZO DISULFIDE DYESTUFFS  
Charles G. Jeremias, Newberry, S.C., and Frederick E. Barwick III, Mount Holly, N.C., assignors to Martin-Marietta Corporation, a corporation of Maryland  
No Drawing. Filed Mar. 11, 1963, Ser. No. 264,045  
5 Claims. (Cl. 260—176)

The present invention relates to dyestuffs, and more particularly to improved azo-disulfide dyestuffs and to the method for making same.

The azo-disulfide dyestuffs of the present invention are particularly characterized in that they have the formula $R_1-N=N-R-S-S-R-N=N-R_1$, wherein R is an aryl or substituted aryl substituent and $R_1$ is an arylide of acetoacetic acid.

The method of the present invention is particularly characterized in that the above azo-disulfide dyestuffs are produced by diazotizing one molecular proportion of a diamino disulfide of the formula $$H_2N-R-S-S-R-NH_2$$

wherein R is an aryl or substituted aryl substituent to form a tetrazo compound, and coupling the tetrazo compound so formed with two molecular proportions of an arylide of acetoacetic acid by reacting said tetrazo compound with an alkaline salt of said arylide of acetoacetic acid.

One of the objects of the present invention is to produce azo-disulfide dyestuffs that will provide a bright greenish-yellow shade on cotton and regenerated cellulose fibers, which shade has not been available in the azo-disulfide dyestuffs of the prior art.

Another object of the present invention is to produce azo-disulfide dyestuffs that have superior wash fastness after they are applied to cotton and regenerated cellulose fibers, which property has not been present in many of the azo-disulfide dyestuffs of the prior art.

A third object of the present invention is to provide azo-disulfide dyestuffs that may be printed on cotton and regenerated cellulose fibers.

Certain azo-disulfide dyestuffs have been known for a number of years, but have never gone into commercial use. Among the disadvantages and limitations of prior azo-disulfide dyestuffs are the following.

Most of the known azo-disulfide dyestuffs will not make wash fast printings on cellulosic fabrics.

Also, azo-disulfide dyestuffs capable of printing cellulosic fibers a bright greenish yellow color are unknown in the prior art.

The above disadvantages and limitations have been overcome by the azo-disulfide dyestuffs of the present invention, as follows.

Azo-disulfide dyestuffs having the formula $$R_1-N=N-R-S-S-R-N=N-R_1$$

wherein R is an aryl or substituted aryl substituent and $R_1$ is an arylide of acetoacetic acid, may be printed on cellulosoic fibers by the reduction-oxidation method and provide a bright greenish yellow shade with superior wash fastness properties.

The aryl or substituted aryl substituent in the above azo-disulfide dyestuffs, represented by R, will usually be phenyl, substituted phenyl, naphthyl, or substituted naphthyl, and preferably phenyl for reasons of economy.

The azo coupling component or color body in the azo-disulfide dyestuffs, represented by $R_1$ is an arylide of acetoaetic acid. Arylides of acetoacetic acid are well known, and may be defined as the product resulting from the condensation of acetoacetic ester with an aromatic amine. Several non-limiting examples of arylides of acetoacetic acid are acetoacetanilide, acetoacet-ortho-anisidide, acetoacet-meta-xylidide, and acetoacet-ortho-toluidide.

The azo-disulfide dyestuffs of the present invention may be prepared by diazotizing a diamino disulfide of the formula $H_2N-R-S-S-R-NH_2$, wherein R is an aryl or substituted aryl substituent, to form a tetrazo compound of the formula $$Cl-N=N-R-S-S-R-N=N-Cl$$

reacting one molecular proportion of the tetrazo compound so formed with two molecular proportions of an alkaline salt of an arylide of acetoacetic acid at pH 6.5–6.8, and recovering the dyestuff thus formed.

Several specific and non-limiting examples of the azo-disulfide dyestuffs and the methods for making same follow.

*Example I*

The tetrazo compound is prepared by adding 24.8 gms. of 100% 4:4′-diaminodiphenyldisulfide to 300 cc. of water at 45° C., and adding thereto 55 gms. of concentrated hydrochloric acid at room temperature with stirring until dissolved. The resulting solution is cooled to 0° C. and held at that temperature while a slight excess of $NaNO_2$, as shown on KI paper, is added thereto with stirring; about 13.8 gms. of $NaNO_2$ will be thus added.

A solution of the arylide of acetoacetic acid is prepared in a separate container by adding 41.4 gms. of 100% aceto-acet-ortho-anisidide to 600 cc. of water at 50° C., and dissolving therein 16 gms. of a 50% aqueous solution of NaOH at room temperature, to form a solution of the sodium salt of acetoacet-ortho-anisidide. Cool the solution to 5° C. and add thereto 50 gms. of sodium acetate buffer, and thereafter add to the buffered solution enough 10% aqueous solution of acetic acid at room temperature to bring the solution to a pH of 6.5–6.8.

The tetrazo compound is coupled with the arylide of acetoacetic acid as follows. While maintaining the solution of the arylide of acetoacetic acid at 0° C., add thereto slowly over a period of 15 minutes, with stirring, the tetrazo compound at 0° C. Continue to stir the mixture at 0° C. until coupling is completed, e.g. for about 60 additional minutes. For optimum results, the coupling is thus carried out at pH of about 6.5–6.8.

Filter the resulting product; wash the resulting solid with water at room temperature; and dry at about 80° C.

A quantitative yield of a bright greenish yellow mass (azo-disulfide dyestuff) results, which may be used to print cotton or regenerated cellulose fibers bright greenish yellow shades of superior wash fastness.

The chemical formula of the resulting dyestuff is:

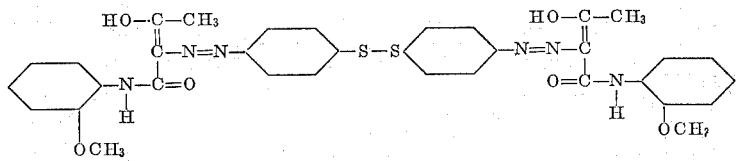

Example II

This example is the same as Example I above, except that 31.7 gms. of 2,2'-dichloro-4:4'-diaminodiphenyldisulfide is substituted for the 4:4'-diaminodiphenyldisulfide in Example I.

A greenish yellow dyestuff which may be used to print cotton and regenerated cellulose a bright, grenish yellow shade with superior wash fastness results.

The dyestuff has the chemical formula:

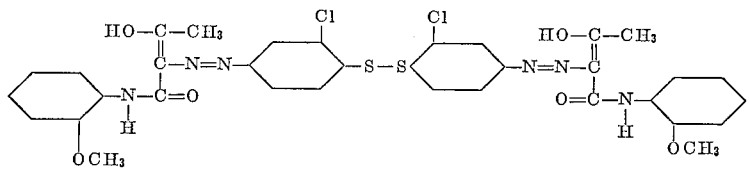

Example III

This example is the same as Example I above, except that 31.7 gms. of 100% 2,2'-dichloro-4:4'-diaminodiphenyldisulfide is substityted for the 4:4'-diaminodiphenyldisulfide and 22.5 gms. of 100% 2-methyl-5-chloro-acetoacetanilide is substituted for the acetoacet-ortho-anisidide in Example I.

The chemical formula for the resulting dyestuff which may be used to print cotton and regenerated cellulose a bright, greenish yellow shade with excellent wash fastness is:

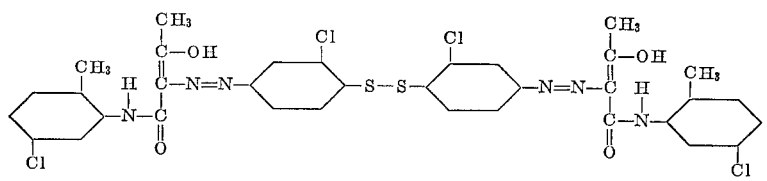

Example IV

This example is the same as Example I above, except that 30.8 gms. of 3,3'-dimethoxy-4:4'-diaminodiphenyldisulfide is substituted for the 4:4'-diaminodiphenyldisulfide utilized in Example I.

The resulting dyestuff prints cotton and regenerated cellulose bright greenish yellow shades of superior wash fastness, and has the chemical formula:

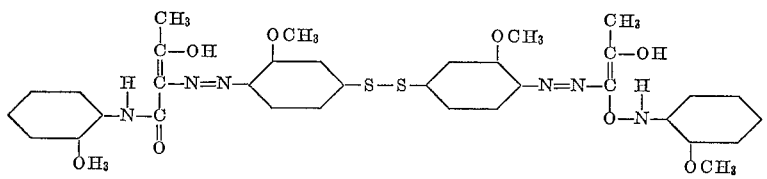

Example V

This example is the same as Example I above, except 27.2 gms. of 2,4-dimethoxy-5-chlor-acetoacetanilide is substituted for the acetoacet-ortho-anisidide utilized in Example I.

The resulting dyestuff will print cotton and regenerated cellulose bright greenish yellow shades of superior wash fastness, and has the chemical formula:

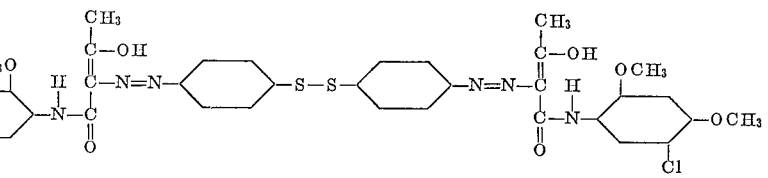

Example VI

This example is the same as Example I above, except that 24.2 gms. of 2-methoxy-5-chloro-acetoacetanilide is substituted for the acetoacet-ortho-anisidide utilized in Example I.

The resulting dye may be utilized to print cotton or regenerated cellulose fibers bright greenish yellow shades of superior wash fastness, and has the following chemical formula:

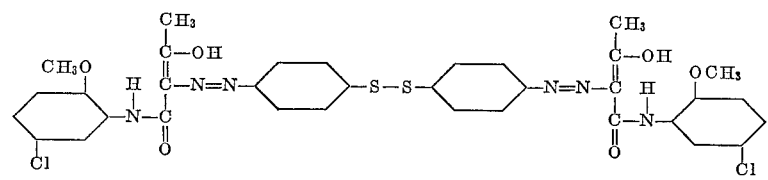

Example VII

This example is the same as Example I above, except that 34.8 gms. of 4:4'-diaminodinaphthyldisulfide is substituted for the 4:4'-diaminodiphenyldisulfide.

The resulting azo-disulfide dyestuff may be used to print cotton and regenerated cellulose fibers bright greenish yellow shades of superior wash fastness, and has the following formula:

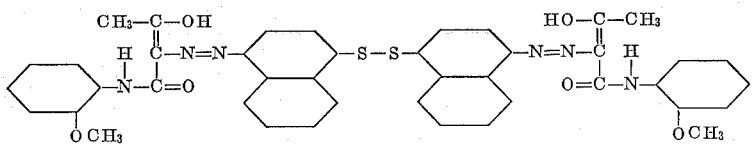

*Example VIII*

This example is the same as Example I above, except that 40.8 gms. of 4:4'-diamino-3:3'-dimethoxydinaphthyldisulfide is substituted for the 4:4'-diaminodiphenyldisulfide.

The resulting azo-disulfide dyestuff may be used to print cotton and regenerated cellulose fibers bright yellow shades of superior wash fastness, and has the following formula:

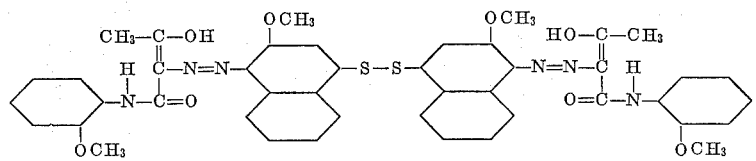

The azo-disulfide dyestuffs of the present invention may be used to print cotton and regenerated cellulose fibers by the reduction oxidation method. For example, apply to cotton fabric a printing paste consisting of 104 gms. starch-tragacanth gum, 4 gms. di(sodiocarboxymethyl) trithiocarbonate reducing agent, 4 gms. diethylene glycol, 4 gms. urea, 3 gms. NaOH, and 15 gms. of 20% aqueous dispersion of azo-disulfide dyestuff; dry the fabric; steam the fabric for 2–10 minutes with air free steam at 212°–225° F. to reduce the dyestuff; oxidize the dyestuff by immersing the fabric for 15 seconds in an acid-oxidizing bath containing 1 oz. of glacial acetic acid and 1 oz. of sodium bichromate per gallon of water at 140° F.; scour and dry the fabric.

It is believed that the chemistry of the printing reaction is as follows. The azo-disulfide dyestuffs of the present invention contain a disulfide linkage (R—S—S—R), which should be considered the normal oxidized state of the dyestuff. Upon reduction in the steamer, the dye molecule is broken between the sulfur atoms to form two molecules, R—S—Na+R—S—Na, in which reduced form it penetrates the fibers. The oxidizing agent then restores the azo-disulfide dyestuff to the R—S—S—R, or normal oxidized state, firmly fixed upon the fibers.

Therefore, it will be understood that dyes having the formula $R_1$—N=N—R—S—Y, wherein $R_1$ is an arylide of acetoacetic acid, R is an aryl of substituted aryl substituent, and Y is a substituent, such as —CN or $NaO_3S$—, which upon being hydrolyzed causes cleavage, yielding a free mercapto group attached to the R substituent, may be prepared and are the chemical equivalent of the dyes herein claimed and are intended to be covered by the appended claims, inasmuch as these equivalent dyes form the azo-disulfide dyestuff of the present invention (the R—S—S—R form) upon being oxidized on the fibers.

What is claimed is:

1. A compound of the formula

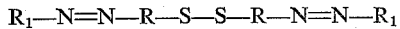

wherein R is a member selected from the group consisting of phenyl and mono-methoxylated phenyl and $R_1$ is an arylide of acetoacetic acid.

2. A compound of the formula

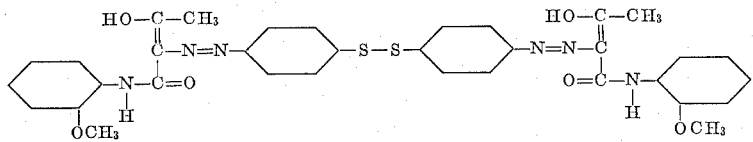

3. A compound of the formula

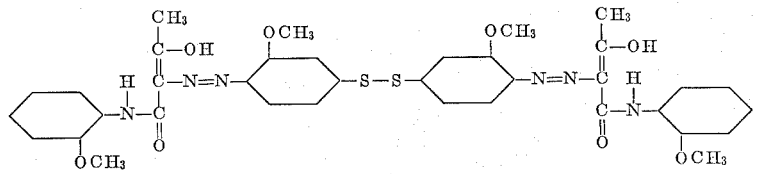

4. A compound of the formula

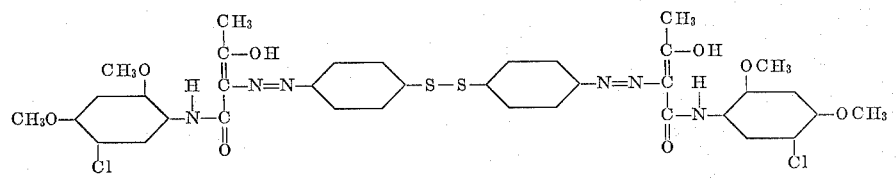

5. A compound of the formula

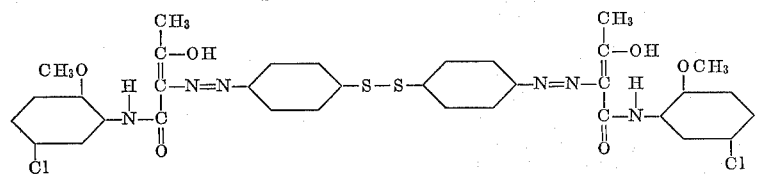

(References on following page)

References Cited by the Examiner

UNITED STATES PATENTS 1,973,635  9/1934  Lantz _____ 260—178

FOREIGN PATENTS 559,784  3/1944  Great Britain.

OTHER REFERENCES

Venkataraman, Synthetic Dyes, pages 699–700 (1952).

CHARLES B. PARKER, *Primary Examiner.*